United States Patent
Zheng et al.

(10) Patent No.: US 12,225,564 B2
(45) Date of Patent: Feb. 11, 2025

(54) WIRELESS COMMUNICATION METHOD, SOURCE NODE AND TARGET NODE

(71) Applicant: VIVO MOBILE COMMUNICATION CO., LTD., Chang'an Dongguan (CN)

(72) Inventors: Qian Zheng, Chang'an Dongguan (CN); Yumin Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 75 days.

(21) Appl. No.: 16/982,340

(22) PCT Filed: Mar. 8, 2019

(86) PCT No.: PCT/CN2019/077417
§ 371 (c)(1),
(2) Date: Sep. 18, 2020

(87) PCT Pub. No.: WO2019/179315
PCT Pub. Date: Sep. 26, 2019

(65) Prior Publication Data
US 2021/0014865 A1 Jan. 14, 2021

(30) Foreign Application Priority Data

Mar. 19, 2018 (CN) .......................... 201810225218.5

(51) Int. Cl.
*H04W 72/53* (2023.01)
*H04W 36/00* (2009.01)
(Continued)

(52) U.S. Cl.
CPC ....... *H04W 72/53* (2023.01); *H04W 36/0083* (2013.01); *H04W 76/27* (2018.02); *H04W 84/18* (2013.01)

(58) Field of Classification Search
None
See application file for complete search history.

(56) References Cited

U.S. PATENT DOCUMENTS

2006/0111112 A1\* 5/2006 Maveddat ............... H04W 8/02
455/461
2011/0216732 A1\* 9/2011 Maeda .................. H04W 72/04
370/329
(Continued)

FOREIGN PATENT DOCUMENTS

| CN | 103718604 A | 4/2014 |
| CN | 107690163 A | 2/2018 |
| EP | 2854451 A1 | 4/2015 |

OTHER PUBLICATIONS

Extended European Search Report for related Application No. 19772118.6; reported on Apr. 15, 2021.
(Continued)

*Primary Examiner* — Suhail Khan
(74) *Attorney, Agent, or Firm* — von Briesen & Roper, s.c.

(57) ABSTRACT

A wireless communication method, a source node and a target node are provided. The method includes: acquiring at least one candidate cell resource configuration, where the at least one candidate cell resource configuration is configured by a target node based on at least one triggering condition; in a case that the at least one triggering condition has a satisfied triggering condition, determining a candidate cell resource configuration associated with a target triggering condition in the satisfied triggering condition as a target cell resource configuration; and initiating a communication process associated with the target triggering condition, based on the target cell resource configuration.

17 Claims, 6 Drawing Sheets

(51) Int. Cl.
    *H04W 76/27*    (2018.01)
    *H04W 84/18*    (2009.01)

(56) References Cited

U.S. PATENT DOCUMENTS

| | | |
|---|---|---|
| 2013/0331103 A1 | 12/2013 | Yang et al. |
| 2014/0120921 A1 | 5/2014 | Keskitalo et al. |
| 2015/0031360 A1 | 1/2015 | Choi et al. |
| 2018/0132158 A1* | 5/2018 | Tseng .................... H04W 76/27 |
| 2020/0022035 A1* | 1/2020 | Kadiri .................... H04W 36/36 |
| 2021/0168673 A1* | 6/2021 | Fan ................. H04W 36/00698 |

OTHER PUBLICATIONS

International Search Report & Written Opinion related to Application No. PCT/CN2019/077417; reported on Oct. 1, 2020.
Chinese Office Action for related Chinese Application No. 201810225218.5; reported on Jul. 2, 2020.
Hisilicon Huawei, "Further discussion on Conditional HO", Jan. 22-26, 2018, 3GPP TSG-RAN2 Meeting #AH-1801, Vancouver, Canada.
Ericsson, "Conditional Handover", Jan. 22-26, 2018, 3GPP TSG-RAN WG2 NRAH#1801, Vancouver, Canada.
Second European Office Action for related Application No. 19772118.6; reported on Jul. 10, 2023.

\* cited by examiner

WIRELESS COMMUNICATION METHOD, SOURCE NODE AND TARGET NODE

CROSS REFERENCE OF RELATED APPLICATION

This patent application is a 35 USC § 371 U.S. national stage of International Application No. PCT/CN2019/077417 filed on Mar. 8, 2019, which claims a priority of Chinese patent application No. 201810225218.5 filed on Mar. 19, 2018, which is incorporated herein by reference in its entirety.

TECHNICAL FIELD

The present disclosure relates to the field of communications technology, and more particular to a wireless communication method, a source node and a target node.

BACKGROUND

During a communication between a user equipment and a network equipment of a wireless communication system, due to a mobility, the connected user equipment may move from a coverage area of one base station to a coverage area of another base station. At this time, the user equipment needs to switch the original radio channel to a new radio channel, that is, a handover needs to be completed.

In a long term evolution (LTE) system, a main reason of a handover failure is that the user equipment cannot receive a handover command issued by a source base station in time. In a new radio (NR) system, the deployment of cells is denser and the cell coverage is relatively small, which will cause the user equipment to perform handovers more frequently. If the user equipment moves to the coverage area of another base station and has not received the handover command issued by the source base station, the handover will fail. Therefore, in NR, the handover method of the LIE system will increase the probability of handover failure. In order to solve such technical issue, the fifth-generation mobile communication technology (5th-Generation, 5G) introduced a conditional handover method. The conditional handover method requires the user equipment to acquire at least one target cell resource configuration before the handover, and when the handover triggering condition is satisfied, one target cell resource configuration is selected from at least one target cell resource configuration for the handover.

On the other hand, in the 5G system, the user equipment may also work in dual connectivity (DC) mode. that is, the user equipment is connected to two nodes, i.e., a master node (Master Node, MN) and a secondary node (Secondary Node, SN), on the network side at the same time. The MN includes a master cell group (Master Cell Group, MCG), and the SN includes a secondary cell group (Secondary Cell Group, SCG). The SCG may work in the NR frequency band (such as the 3.5GHz high frequency band), so there is a high probability that the user equipment will fail to access the SCG. This technical issue may also be solved by acquiring at least one target cell resource configuration before the SCG failure and successfully accessing from the target cell resource configuration when the SCG fails.

However, in the above-mentioned scenario, how to determine the target cell resource configuration acquired in advance by the user equipment still needs to be solved urgently.

SUMMARY

The present disclosure is to provide a wireless communication method, a source node and a target node, so as to provide a solution for determining the cell resource configuration acquired in advance by the user equipment, thereby improving the effectiveness of communication.

In a first aspect, a wireless communication method is provided, applied to a user equipment, including:

acquiring at least one candidate cell resource configuration, where the at least one candidate cell resource configuration is configured by a target node based on at least one triggering condition;

in a case that the at least one triggering condition has a satisfied triggering condition, determining a candidate cell resource configuration associated with a target triggering condition in the satisfied triggering condition as a target cell resource configuration; and initiating a communication process associated with the target triggering condition, based on the target cell resource configuration.

In a second aspect, a wireless communication method is provided, applied to a source node, including:

receiving at least one candidate cell resource configuration sent by a target node, where the at least one candidate cell resource configuration is configured by the target node based on at least one triggering condition, the at least one candidate cell resource configuration is configured to, in a case that a user equipment determines that the at least one triggering condition has a satisfied triggering condition, enable the user equipment to determine a candidate cell resource configuration associated with a target triggering condition in the satisfied triggering condition as a target cell resource configuration and initiate, based on the target cell resource configuration, a communication process associated with the target triggering condition; and sending an RRC reconfiguration message to a user equipment, where the RRC reconfiguration message includes the at least one candidate cell resource configuration.

In a third aspect, a wireless communication method is provided, applied to a target node, including:

configuring at least one candidate cell resource configuration based on at least one triggering condition, where the at least one candidate cell resource configuration is configured to, in a case that a user equipment determines that the at least one triggering condition has a satisfied triggering condition, enable the user equipment to determine a candidate cell resource configuration associated with a target triggering condition in the satisfied triggering condition as a target cell resource configuration and initiate, based on the target cell resource configuration, a communication process associated with the target triggering condition; and sending the at least one candidate cell resource configuration to a source node, where the source node is configured to forward the at least one candidate cell resource configuration to the user equipment.

In a fourth aspect, a user equipment is provided, including:

an acquiring module, configured to acquire at least one candidate cell resource configuration, where the at least one candidate cell resource configuration is configured by a target node based on at least one triggering condition;

a determining module, configured to, in a case that the at least one triggering condition has a satisfied triggering condition, determine a candidate cell resource configuration associated with a target triggering condition in the satisfied triggering condition as a target cell resource configuration; and a communicating module, configured to initiate a communication process associated with the target triggering condition, based on the target cell resource configuration.

In a fifth aspect, a source node is provided, including:

a receiving module, configured to receive at least one candidate cell resource configuration sent by a target node, where the at least one candidate cell resource configuration is configured by the target node based on at least one triggering condition, the at least one candidate cell resource configuration is configured to, in a case that a user equipment determines that the at least one triggering condition has a satisfied triggering condition, enable the user equipment to determine a candidate cell resource configuration associated with a target triggering condition in the satisfied triggering condition as a target cell resource configuration and initiate, based on the target cell resource configuration, a communication process associated with the target triggering condition; and a sending module, configured to send an RRC reconfiguration message to a user equipment, where the RRC reconfiguration message includes the at least one candidate cell resource configuration.

In a sixth aspect, a target node is provided, including:

a determining module, configured to configure at least one candidate cell resource configuration based on at least one triggering condition, where the at least one candidate cell resource configuration is configured to, in a case that a user equipment determines that the at least one triggering condition has a satisfied triggering condition, enable the user equipment to determine a candidate cell resource configuration associated with a target triggering condition in the satisfied triggering condition as a target cell resource configuration and initiate, based on the target cell resource configuration, a communication process associated with the target triggering condition; and a transceiving module, configured to send the at least one candidate cell resource configuration to a source node, where the source node is configured to forward the at least one candidate cell resource configuration to the user equipment.

In a seventh aspect, a user equipment is provided, including: a memory, a processor and a computer program stored in the memory and executable on the processor, where the processor executes the computer program to perform the wireless communication method in the first aspect.

In an eighth aspect, a source node is provided, including: a memory, a processor and a computer program stored in the memory and executable on the processor, where the processor executes the computer program to perform the wireless communication method in the second aspect.

In a ninth aspect, a source node is provided, including: a memory, a processor and a computer program target node is provided, including: a memory, a processor and a computer program stored in the memory and executable on the processor, where the processor executes the computer program to perform the wireless communication method in the third aspect.

In a tenth aspect, a computer-readable medium is provided, where a computer program is stored in the computer-readable medium and a processor executes the computer program to perform the wireless communication method in the first aspect.

In an eleventh aspect, a computer-readable medium is provided, where a computer program is stored in the computer-readable medium, and a processor executes the computer program to perform the wireless communication method in the second aspect.

In a twelfth aspect, a computer-readable medium is provided, where a computer program is stored in the computer-readable medium, and a processor executes the computer program to perform the wireless communication method in the third aspect.

According to the embodiments of the present disclosure, the at least one candidate cell resource configuration acquired by the user equipment is configured by the target node based on at least one triggering condition, which provides a solution for determining the cell resource configuration acquired in advance by the user equipment. In addition, when the user equipment determines that there is a satisfied triggering condition in at least one triggering condition, the user equipment may initiate a communication process associated with the target triggering condition through the candidate cell resource associated with the target triggering condition in the satisfied triggering condition, thereby satisfying the service requirements of different businesses of the user equipment, maximizing the utilization ratio of network resources and improving the effectiveness of communication.

BRIEF DESCRIPTION OF THE DRAWINGS

The drawings described here are used to provide a further understanding of the present disclosure and constitute a part of the present disclosure. The exemplary embodiments and descriptions of the present disclosure are used to explain the present disclosure, and do not constitute an improper limitation of the present disclosure.

DETAILED DESCRIPTION

The technical solutions in the embodiments of the present disclosure will be described clearly and completely with reference to the drawings in the embodiments of the present disclosure. Obviously, the described embodiments are part of the embodiments of the present disclosure, rather than all of the embodiments. Based on the embodiments in the present disclosure, all other embodiments obtained by those of ordinary skill in the art without creative work fall within the scope of the present disclosure.

The technical solutions of the present disclosure may be applied to various communication systems, such as: Global System of Mobile Communication (GSM), Code Division Multiple Access (CDMA) systems, Wideband Code Division Multiple Access (GSM) systems, Wideband Code Division Multiple Access (WCDMA) system, General Packet Radio Service (CPRS) system, Long Term Evolution (LTE)/Long Term Evolution-advanced (LTE-A) system, New Radio (NR) system, etc.

A user equipment (UE), also known as mobile terminal (Mobile Terminal), mobile user equipment, etc., can communicate with one or more core networks via a radio access network (RAN) The user equipment may be a mobile terminal, such as a mobile phone (or "cellular" phone) and a computer with a mobile terminal. For example, the user equipment may be a portable, pocket-sized, handheld, built-in computer or vehicle-mounted mobile device and exchanges language and/or data with the radio access network.

The source node and the target node are devices deployed in a radio access network device to provide wireless communication functions for user equipment. The source node and the target node may be base stations, and the base stations may be base stations in GSM or CDMA (Base Transceiver Station (BTS), a base station (NodeB) in WCDMA, or an evolved base station (eNB or e-NodeB, evolutional Node B) and a 5G base station (gNB) in LTE.

The technical solutions in the embodiments of the present disclosure will be described in detail below with reference to the drawings.

It should be noted that the candidate cell resource configuration in the embodiments of the present disclosure may be understood as a candidate cell resource, that is, a cell resource configured by a target node based on at least one triggering condition. Similarly, the target cell resource configuration in the embodiments of the present disclosure may be understood as candidate cell resources associated with the target triggering conditions.

Figure 1:
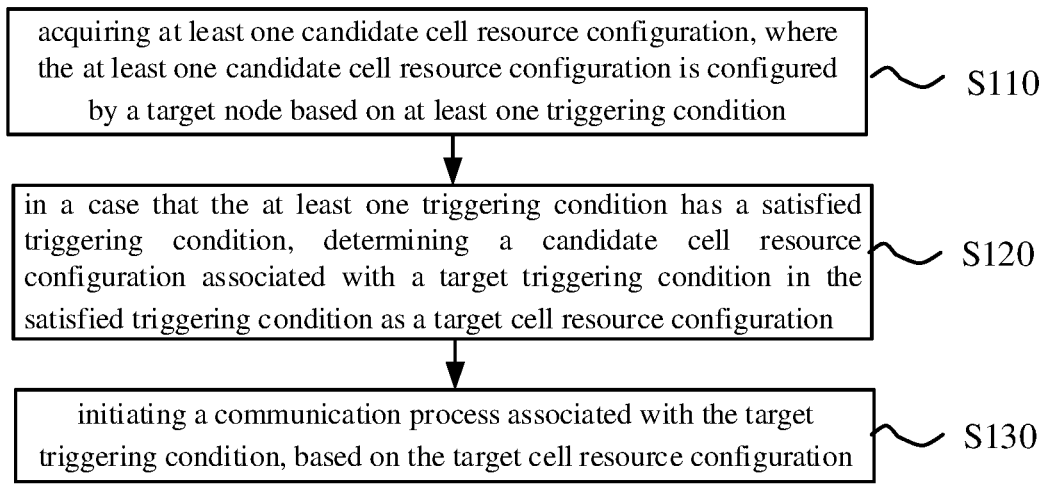
FIG. 1 is a schematic flowchart of a wireless communication method in an embodiment of the present disclosure.

FIG. 1 shows a wireless communication method in an embodiment of the present disclosure. When the method shown in FIG. 1 is applied in a single connectivity scenario, the source node and the target node are the source base station and the target base station, respectively, When the method shown in FIG. 1 is applied to a dual connectivity scenario, the source node is the source master node or the source secondary node, and the target node is the target secondary node. The method shown in FIG. 1 is performed by a user equipment, and the method shown in FIG. 1 includes:

S110: acquiring at least one candidate cell resource configuration, where the at least one candidate cell resource configuration is configured by a target node based on at least one triggering condition.

Optionally, in some embodiments of the present disclosure, each of the at least one triggering condition includes one or more of the following conditions: a data packet transmission delay is greater than or equal to a first preset threshold; a packet loss of the data packet is greater than or equal to a second preset threshold; a data transmission rate is greater than or equal to a third preset threshold; an Integrity Protection Check Failure; a radio link failure (RLF); a radio resource control (RRC) reconfiguration failure; a handover failure; and a secondary cell group (SCG) access failure. Here, the RRC reconfiguration failure may include the resource reconfiguration failure of the (MCG), or the resource reconfiguration failure of the SCG, or the resource reconfiguration failures of the MCG and the SCG. The SCG access failure may include a SCG change (Change) failure, or the maximum uplink transmission time difference between MCG and SCG exceeds a limit.

Based on the at least one triggering condition in the above optional embodiment, the resource configuration of at least one candidate cell is configured by the target node based on the at least one triggering condition. It can be understood that the target node configures at least one candidate cell resource configuration based on the at least one triggering condition, and the at least one candidate cell resource configuration configured by the target node needs to meet the service requirements of the user equipment, or it can be understood as that each candidate cell resource configuration is associated with one or more triggering conditions. In other words, each candidate cell resource configuration meets service requirements corresponding to one or more triggering conditions. Further, when a triggering condition includes a plurality of the above conditions, the candidate cell resource configuration associated with the triggering condition configured by the target node needs to meet the service requirements corresponding to the multiple conditions.

For example, if one of the at least one triggering condition includes that the data packet transmission delay is greater than or equal to the first preset threshold, the candidate cell resource configuration configured by the target node based on the triggering condition needs to satisfy that the low data packet transmission delay is smaller than first preset threshold. When the user equipment determines that the data packet transmission delay is greater than or equal to the first preset threshold, the user equipment uses the candidate cell resource configuration configured by the target base station based on the triggering condition to make the data packet transmission delay to be lower than the first preset threshold. Alternatively, one of the at least one triggering condition includes that the transmission delay of the data packet is greater than or equal to the first preset threshold and the packet loss rate of the data packet is greater than or equal to the second preset threshold, then the candidate cell resource configuration configured by the target node based on the triggering condition needs to satisfy that the data packet transmission delay is lower than the first preset threshold and the packet loss rate of the data packet is lower than the second preset threshold.

Based on at least one triggering condition in the foregoing embodiment, the number of candidate cell resource configurations configured by the target node based on one of the at least one triggering condition may be one or more. For example, if one of the at least one triggering condition is that the packet loss rate of the data packet is greater than or equal to the second preset threshold, the target node may configure a candidate cell source configuration based on the triggering condition, therefore in a case that the user equipment determines that the packet loss rate of the data packet is greater than or equal to the second preset threshold, the user equipment uses the candidate cell resource configuration to make the packet loss rate of the data packet lower than the second preset threshold. Alternatively, one of at least one triggering condition is SCG access failure. Since one SCG corresponds to one cell group, taking an example that this cell group includes 3 cells, a quantity of the candidate cell resource configurations configured by the target node based on the triggering condition is 3.

Optionally, as an example, the acquiring the at least one candidate cell resource configuration includes: receiving an RRC reconfiguration message from a source node, where the RRC reconfiguration message includes the at least one candidate cell resource configuration. It can be understood that if the method is applied to a single connectivity scenario, the user equipment receives the RRC reconfiguration message from the source base station. If the method is applied in a dual connectivity scenario, the user equipment receives the RRC reconfiguration message from the source master node or the source secondary node.

Further, the RRC reconfiguration message also includes at least one triggering condition, that is, the source node sends the at least one triggering condition to the user equipment while sending the candidate cell resource configuration to the user equipment. It may be understandable that if at least one triggering condition is determined by an agreement, the RRC reconfiguration message does not need to include at least one triggering condition.

It may be understood that at least one triggering condition in the foregoing embodiment may be determined by the source node, may be determined by the source node and the target node through an agreement, or may be determined by the target node. The method of determining at least one triggering condition will be described in detail below in conjunction with examples.

S120: in a case that the at least one triggering condition has a satisfied triggering condition, determining a candidate cell resource configuration associated with a target triggering condition in the satisfied triggering condition as a target cell resource configuration.

Optionally, in some embodiments of the present disclosure, a quantity of satisfied triggering conditions in the at least one triggering condition may be one or more. When there are a plurality of satisfied triggering conditions, the user equipment needs to select one satisfied triggering condition as the target triggering condition, and determines the candidate cell resource configuration associated with the target triggering condition as the target cell resource configuration.

Specifically, there are a plurality of satisfied triggering conditions, the user equipment may randomly select one triggering condition from the satisfied triggering conditions as the target triggering condition, or the user equipment selects the target triggering condition from the satisfied triggering conditions according to the preset triggering condition priorities. Here, the preset triggering condition priorities may be determined by an agreement or sent by the source node to the user equipment.

For example, if the satisfied triggering conditions include the packet loss rate of the data packet being greater than or equal to the second preset threshold and the radio link failure, the user equipment may determine the candidate cell resource configuration associated with the triggering condition of the packet loss rate of data packet being greater than or equal to the second preset threshold as the target cell resource configuration. If the preset triggering condition priority is that a priority of the radio link failure is higher than a priority of the packet loss rate of data packet being greater than or equal to the second preset threshold, the user equipment needs to determine the candidate cell resource configuration associated with the triggering condition of the radio link failure as the target cell resource configuration. If the preset triggering condition priority is that a priority of a triggering condition where both the packet loss rate of data packet being greater than or equal to the second preset threshold and the radio link failure are satisfied is higher than the priority of the packet loss rate of data packet being greater than or equal to the second preset threshold, and the priority of the triggering condition where both the packet loss rate of data packet being greater than or equal to the second preset threshold and the radio link failure are satisfied is higher the priority of the radio link failure, the terminal needs to determine the candidate cell resource configuration associated with the triggering condition where both the packet loss rate of data packet being greater than or equal to the second preset threshold and the radio link failure are satisfied as the target cell resource configuration.

S130: initiating a communication process associated with the target triggering condition, based on the target cell resource configuration.

It can be understood that, with the different satisfied triggering conditions the communication processes allowed to be initiated by the user equipment are different. Therefore, in S130, the user equipment needs to initiate a communication process associated with the target triggering condition.

Optionally, in some embodiments of the present disclosure, the communication process associated with the target triggering condition includes one of the following processes: a handover process, an RRC reestablishment process, an SN Addition process, an SN Modification process, an SN Release process and an SN Change process.

For example, if the target triggering condition is the integrity protection check failure, the communication process associated with the target triggering condition is an RRC reestablishment process or a handover process. If the target triggering condition is the SCG access failure, the communication process associated with the target triggering condition is initiating an SN Change process for a certain SCG or initiating an SN Release process for an original SCG. If the target triggering condition is that the data transmission rate is greater than or equal to the third preset threshold, the communication process associated with the target triggering condition is initiating an SN Addition process for a certain SCG. If the target triggering condition is that the data packet transmission delay is greater than or equal to a first preset value, the communication process associated with the target triggering condition is initiating an SN Modification process for a source SCG.

Figure 2:
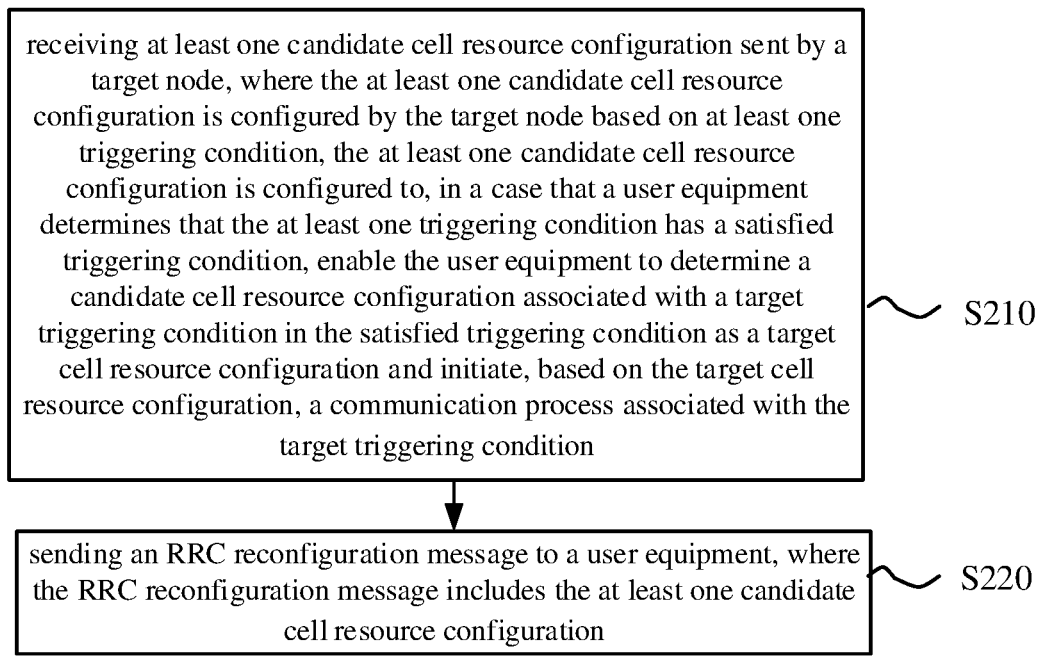
FIG. 2 is a schematic flowchart of a wireless communication method in another embodiment of the present disclosure.

FIG. 2. is a schematic flowchart of a wireless communication method in another embodiment of the present disclosure. When the method shown in FIG. 2 is applied in a single connectivity scenario, the source node and the target node are a source base station and a target base station respectively. When the method shown in FIG. 2 is applied in a dual connectivity scenario, the source node is a source master node or a source secondary node, and the target node is a target secondary node, In addition, it may be understood that the interaction between the source node and the user equipment described at the source node side is the same as the description at the user equipment side in the method shown in FIG. 1, and to avoid repetition, the relevant description is omitted. The method shown in FIG. 2 is performed by the source node, and the method shown in FIG. 2 includes:

S210: receiving at least one candidate cell resource configuration sent by a target node, where the at least one candidate cell resource configuration is configured by the target node based on at least one triggering condition, the at least one candidate cell resource configuration is configured to, in a case that a user equipment determines that the at least one triggering condition has a satisfied triggering condition, enable the user equipment to determine a candidate cell resource configuration associated with a target triggering condition in the satisfied triggering condition as a target cell resource configuration and initiate, based on the target cell resource configuration, a communication process associated with the target triggering condition.

S220: sending an RRC reconfiguration message to a user equipment, where the RRC reconfiguration message includes the at least one candidate cell resource configuration.

It may be understood that, in S220, the source node may send the at least one candidate cell resource configuration to the user equipment in another manner.

According to the wireless communication method in the embodiment of the present disclosure, after receiving at least one candidate cell resource configuration sent by the target node, the source node transmits the at least one candidate cell resource configuration to the user equipment. At least one candidate cell resource configuration is configured by the target node based on at least one triggering condition, thereby providing a solution for determining the cell resource configuration acquired in advance by the user equipment. In addition, when the user equipment determines that there is a satisfied triggering condition in the at least one triggering condition, the user equipment determines the candidate cell resource configuration associated with the target triggering condition in the satisfied triggering condition as the target cell resource configuration, and initiates the communication process associated with the target triggering condition based on the target cell resource configuration, thereby satisfying the service requirements of different businesses of the user equipment, maximizing the utilization ratio of network resources and improving the effectiveness of communication.

Optionally, in an embodiment of the present disclosure, each of the at least one triggering condition includes one or more of the following conditions: a data packet transmission delay is greater than or equal to a first preset threshold; a packet loss rate of data packet is greater than or equal to a second preset threshold; a data transmission rate is greater than or equal to a third preset threshold; an integrity protection check failure; a radio link failure; an RRC reconfiguration failure; a handover failure; and a SCG access failure.

Optionally, in an embodiment of the present disclosure, the RRC reconfiguration message further includes the at least one handover triggering condition.

Optionally, in an embodiment of the present disclosure, the at least one triggering condition is determined by the source node. Before S210, the method shown in FIG. 2 further includes: sending the at least one triggering condition to the target node. That is, the source node needs to firstly send the at least one determined triggering condition to the target node, and after receiving the at least one triggering condition, the target node configures the at least one candidate cell resource configuration based on the at least one triggering condition.

Figure 3:
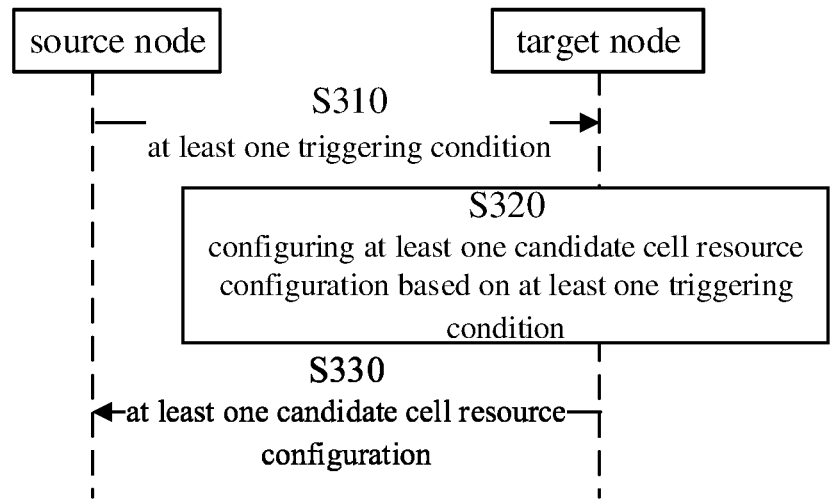
FIG. 3 is a schematic flowchart of a method of determining at least one triggering condition by a source node in an embodiment of the present disclosure.

For example, FIG. 3 is a schematic flowchart of a method of determining at least one triggering condition by a source node in an embodiment of the present disclosure. As shown in FIG. 3. at S310, the source node sends the at least one triggering condition to the target node.

For example, the source node carries at least one triggering condition in a Handover Request sent to the target node. For another example, the source node carries at least one triggering condition in the SN Addition Request sent to the target node.

Optionally, as an example, the source node determines the at least one triggering condition based on the service requirements of the user equipment, the radio link quality and the wireless resource configuration situation.

At S320, the target node configures at least one candidate cell resource configuration based on at least one triggering condition.

For example, at least one triggering condition sent by the source node to the target node includes a triggering condition A, a triggering condition B, and a triggering condition C. According to the situation of tie target node, the target node may choose to be configured with the candidate cell resource configuration associated with triggering condition A, the candidate cell resource configuration associated with triggering condition B and the candidate cell resource configuration associated with triggering condition C, or according to the situation of the target node, the target node may choose to be configured with only the candidate cell resource configuration associated with triggering condition A and the candidate cell resource configuration associated with triggering condition B.

At S320, the target node sends to the source node at least one candidate cell resource configuration configured based on at least one triggering condition.

For example, the target node carries at least one candidate cell resource configuration in a Handover Request Acknowledgement (ACK) sent to the source node. For another example, the target node carries at least one candidate cell resource configuration in the SN Addition Request ACK sent to the source node.

Optionally, at S320, the target node may send at least one candidate cell resource configuration configured based on one triggering condition to the source node while sending the triggering condition associated with the candidate cell resource configuration to the source node. For example, the target node sends the triggering condition A and the triggering condition B to the source node, as well as the candidate cell resource configuration associated with the triggering condition A and the candidate cell resource configuration associated with the triggering condition B.

Optionally, in an embodiment of the present disclosure, the at least one triggering condition is determined by agreement between the source node and the target node. Before S210, the method shown in FIG. 2 further includes: receiving candidate triggering conditions sent by the target node; determining the at least one triggering condition from the candidate triggering conditions; and sending the at least one triggering condition to the target node.

Figure 4:
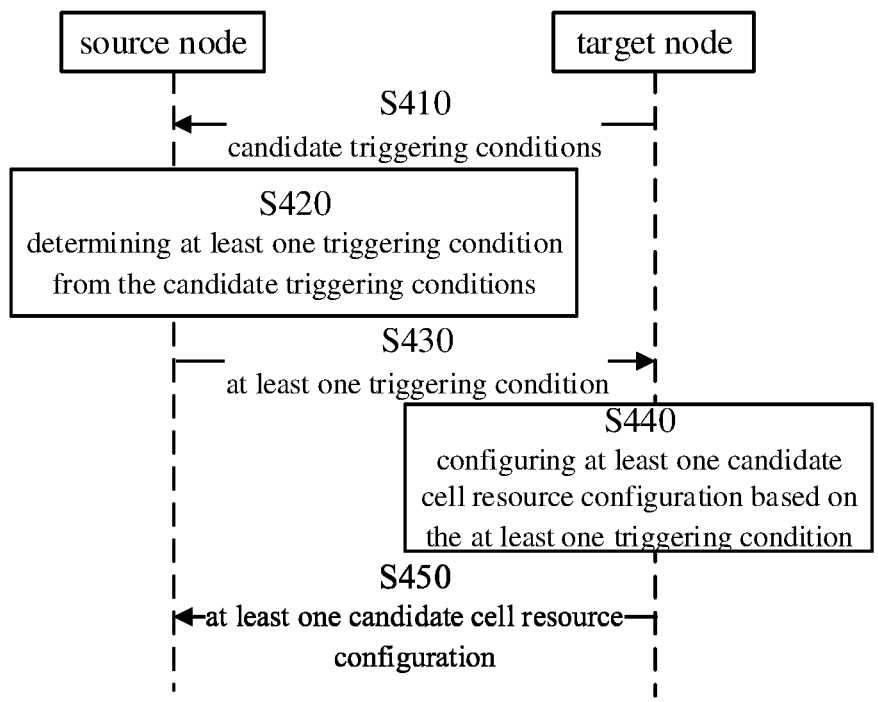
FIG. 4 is a schematic flowchart of a method of determining at least one triggering condition by an agreement between a source node and a target node in an embodiment of the present disclosure.

For example, FIG. 4 is a schematic flowchart of a method of determining at least one triggering condition by an agreement between a source node and a target node in an embodiment of the present disclosure. As shown in FIG. 4. at S410, the target node sends the candidate triggering conditions to the source node.

At S420, the source node determines at least one triggering condition from the candidate triggering conditions.

At S430, the source node sends the at least one triggering condition to the target node.

At S440, the target node configures at least one candidate cell resource configuration based on the at least one triggering condition.

At S450, the target node sends to the source node the at least one candidate cell resource configuration configured based on the at least one triggering condition.

It should be noted that in the method shown in FIG. 4, the method of the source node determining at least one triggering condition, the source node sending the at least one triggering condition to the target node, the target node configuring at least one candidate cell resource based on the at least one triggering condition and the target node sending at least one candidate cell resource configuration to the source node is similar to the corresponding method in the method shown in FIG. 3, and to avoid repetition, details thereof are not repeated here.

Optionally, in an embodiment of the present disclosure, the at least one triggering condition is determined by the target node, and the method further shown in FIG.2 includes: receiving the at least one triggering condition sent by the target node.

Optionally, in an embodiment of the present disclosure, the at least one triggering condition is determined by a target node from candidate triggering conditions. Before the receiving the at least one triggering condition sent by the target node, the method shown in FIG. 2 further includes:

sending the candidate triggering conditions to the target node;

receiving candidate triggering conditions sent by the target node; determining the at least one triggering condition from the candidate triggering conditions; and sending the at least one triggering condition to the target node.

Figure 5:
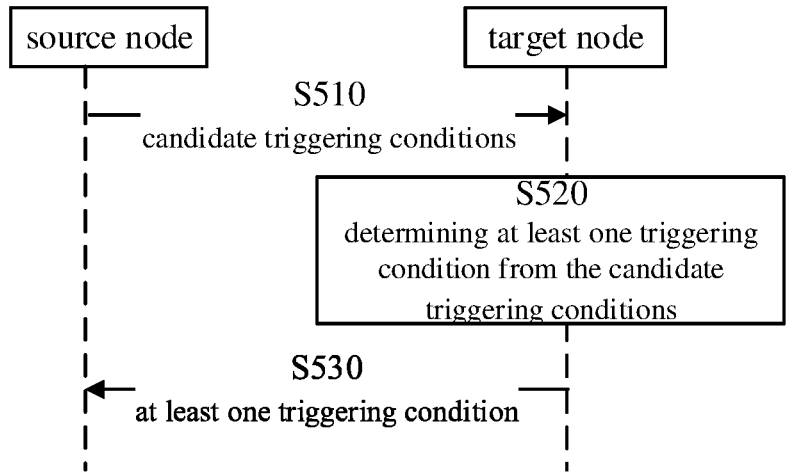
FIG. 5 is a schematic flowchart of a method of determining at least one triggering condition by a target node in an embodiment of the present disclosure.

For example, FIG, 5 is a schematic flowchart of a method of determining at least one triggering condition by a target node in an embodiment of the present disclosure. As shown in FIG. 5, at S510, the source node sends candidate triggering conditions to the target node.

It should be noted that the candidate triggering condition may also be determined by an agreement. In this case, the source node may not send the candidate triggering conditions to the candidate node. That is, the method shown in FIG. 5 may not include S510.

At S520, the target node determines at least one triggering condition from the candidate triggering conditions.

At S530, the target node sends the at east one triggering condition to the source node.

For example, in S510, the candidate triggering conditions sent by the source node to the target node include a triggering condition A, a triggering condition B, and a triggering condition C. At S520, the at least one triggering condition determined by the target node includes the triggering condition A and the triggering condition B. At S530, the target node sends the triggering condition A and triggering condition B to the source node. After that, when the target node receives the Handover Request (not carrying the triggering condition A and the triggering condition B) sent by the source node, the target node configures the candidate cell resource configuration based on the triggering condition A and the triggering condition B.

Optionally, in an embodiment of the present disclosure, the at least one triggering condition is determined by an agreement. In this case, the source node may not send the at least one triggering condition to the target node and the user equipment. In this case, the source node may not carry the at least one triggering condition in the Handover Request sent to the target node, but only add 1 bit to the Handover Request to indicate that the Handover Request is an condition-based Handover Request in the embodiments of the present disclosure. Alternatively, the source node may not carry the at least one triggering condition in the SN Addition Request sent to the target node, but only add 1 bit to the SN Addition Request to indicate that the SN Addition Request is a condition-based SN Addition Request in the embodiments of the present disclosure.

Optionally, in an embodiment of the present disclosure, when the method described in FIG. 2 is applied in a dual connectivity scenario, the source node is a source master node or a source secondary node, and the target node is a target secondary node.

Figure 6:
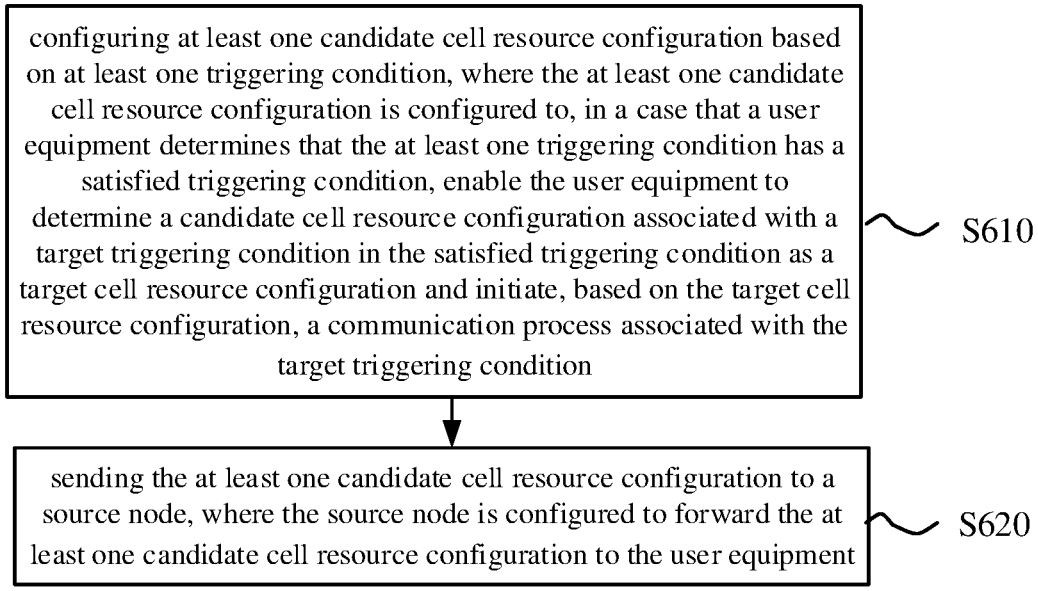
FIG. 6 is a schematic flowchart of a wireless communication method in another embodiment of the present disclosure.

FIG. 6 is a schematic flowthart of a wireless communication method in another embodiment of the present disclosure. When the method shown in FIG. 6 is applied in a single connectivity scenario, the source node and the target node are a source base station and a target base station respectively. When the method shown in FIG. 6 is applied to a dual connectivity scenario, the source node is a source master node or a source secondary node, and the target node is a target secondary node. In addition, it can be understood that the interaction between the source node and the target node described from the target node side is the same as the description at the source node side in the methods shown in FIGS. 2 to 5, and related descriptions are omitted to avoid repetition. The method shown in FIG. 6 is performed by the target node, and the method shown in FIG. 6 includes:

S610: configuring at least one candidate cell resource configuration based on at least one triggering condition, where the at least one candidate cell resource configuration is configured to, in a case that a user equipment determines that the at least one triggering condition has a satisfied triggering condition, enable the user equipment to determine a candidate cell resource configuration associated with a target triggering condition in the satisfied triggering condition as a target cell resource configuration and initiate, based on the target cell resource configuration, a communication process associated with the target triggering condition; and S620: sending the at least one candidate cell resource configuration to a source node, where the source node is configured to forward the at least one candidate cell resource configuration to the user equipment.

According to the wireless communication method in the embodiment of the present disclosure, the target node configures at least one candidate cell resource configuration based on at least one triggering condition, thereby providing a solution for determining the cell resource configuration acquired in advance by the user equipment. In addition, the target node sends at least one candidate cell resource configuration to the source node, to enable the source node forwards the at least one candidate cell resource configuration to the user equipment, so that when the user equipment determines that there is a satisfied triggering condition in the at least one triggering condition, the user equipment determines the candidate cell resource configuration associated with the target triggering condition in the satisfied triggering condition as the target cell resource configuration, and initiates the communication process associated with the target triggering condition based on the target cell resource configuration, thereby satisfying the service requirements of different businesses of the user equipment, maximizing the utilization ratio of network resources and improving the effectiveness of communication.

Optionally, in an embodiment of the present disclosure, each of the at least one triggering condition includes one or more of the following conditions: a data packet transmission delay is greater than or equal to a first preset threshold; a packet loss rate of data packet is greater than or equal to a second preset threshold; a data transmission rate is greater than or equal to a third preset threshold; an integrity protection check failure; a radio link failure; an RRC reconfiguration failure; a handover failure; and a SCG access failure.

Optionally, in an embodiment of the present disclosure, the at least one triggering condition is determined by the source node;

Before S610, the method shown in FIG. 6 further includes: receiving the at least one triggering condition sent by the source node.

Optionally, in an embodiment of the present disclosure, the triggering condition is determined by an agreement between the source node and the target node, and the triggering condition is determined by the source node from candidate triggering conditions.

Before S610, the method shown in FIG. 6 further includes: sending the candidate triggering conditions to the source node; and receiving the at least one triggering condition sent by the source node.

Optionally, in an embodiment of the present disclosure, the at least one triggering condition is determined by the target node, and the method shown in FIG. 6 further includes: sending the at least one triggering condition to the source node.

Optionally, in an embodiment of the present disclosure, the at least one triggering condition is determined by the target node from candidate triggering conditions.

Before S610, the method shown in FIG. 6 further includes: receiving candidate triggering conditions sent by the source node; and determining the at least one triggering condition from the candidate triggering conditions.

Optionally, in an embodiment of the present disclosure, the at least one triggering condition is determined by an agreement.

Optionally, in an embodiment of the present disclosure, when the method is applied in a dual connectivity scenario, the source node is a source master node or a source secondary node, and the target node is a target secondary node.

Figure 7:
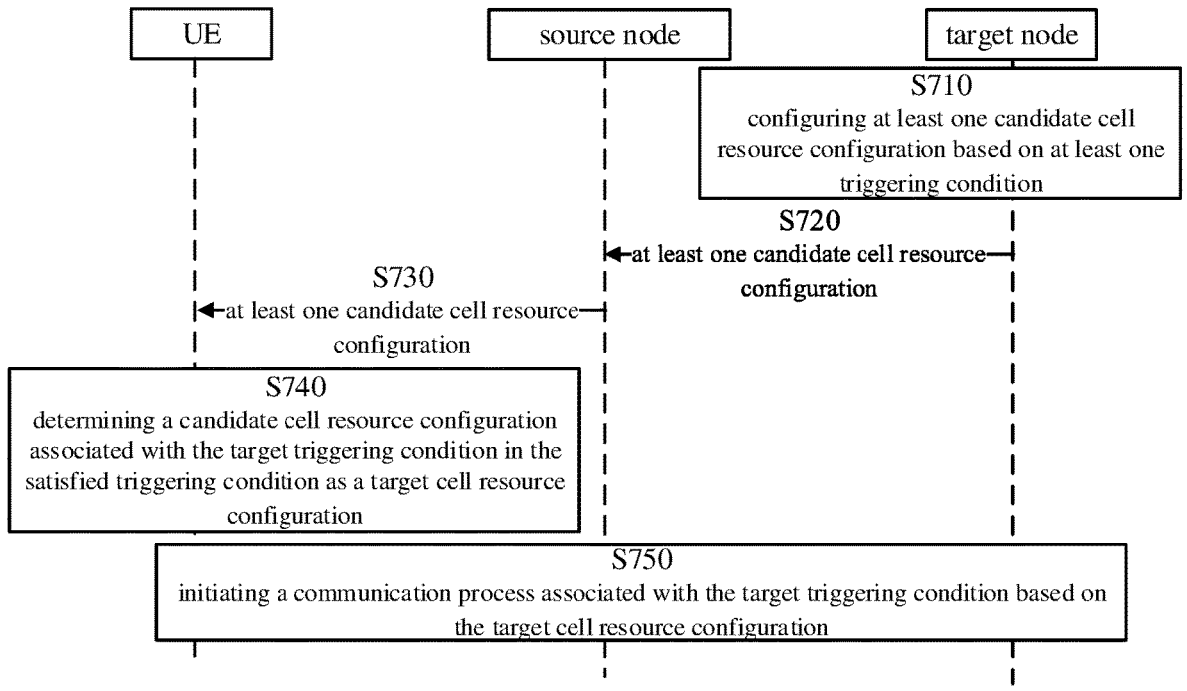
FIG. 7 is a schematic flowchart of a wireless communication method in an embodiment of the present disclosure.

FIG. 7 is a schematic flowchart of a wireless communication method in an embodiment of the present disclosure. When the method shown in FIG. 7 is applied in a single connectivity scenario, the source node and the target node are a source base station and a target base station respectively. When the method shown in FIG. 7 is applied in a dual connectivity scenario, the source node is a source master node or a source secondary node, and the target node is a target secondary node. The method shown in FIG.7 includes:

S710: a target node configuring at least one candidate cell resource configuration based on at least one triggering condition.

S720: the target node sending the at least one candidate cell resource configuration to the source node.

S730: the source node sending the at least one candidate cell resource configuration to the user equipment.

S740: the user equipment determining a satisfied triggering condition in the at least one triggering condition, and determining a candidate cell resource configuration associated with the target triggering condition in the satisfied triggering condition as a target cell resource configuration.

S750: the user equipment initiating a communication process associated with the target triggering condition based on the target cell resource configuration.

It should be noted that, in the method shown in FIG. 7, a method of determining at least one triggering condition, a target node sending at least one candidate cell resource configuration to a source node, a source node sending at least one candidate cell resource configuration to a user equipment, the user equipment determining the target triggering condition from the satisfied triggering conditions and the user equipment initiating the communication process associated with the target triggering condition based on the target cell resource configuration may refer to the related description in the methods shown in FIGS. 2 to 6 above, in order to avoid repetition, details thereof will not be repeated herein, The wireless communication method in the embodiment of the present disclosure is described in detail above with reference to FIGS. 1 to 7. The user equipment in the embodiment of the present disclosure will be described in detail below with reference to FIG. 8.

Figure 8:
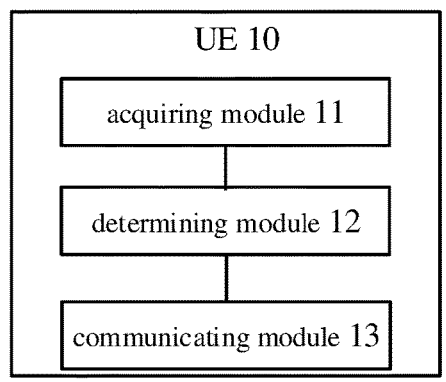
FIG. 8 is a schematic structural diagram of a user equipment in an embodiment of the present disclosure.

FIG. 8 is a schematic structural diagram of a user equipment in an embodiment of the present disclosure. As shown in FIG. 8, the user equipment 10 includes:

an acquiring module 11, configured to acquire at least one candidate cell resource configuration, where the at least one candidate cell resource configuration is configured by a target node based on at least one triggering condition;

a determining module 12, configured to, in a case that the at least one triggering condition has a satisfied triggering condition, determine a candidate cell resource configuration associated with a target triggering condition in the satisfied triggering condition as a target cell resource configuration; and a communicating module 13, configured to initiate a communication process associated with the target triggering condition, based on the target cell resource configuration.

According to the embodiments of the present disclosure, the at least one candidate cell resource configuration acquired by the user equipment is configured by the target node based on at least one triggering condition, which provides a solution for determining the cell resource configuration acquired in advance by the user equipment. In addition, when the user equipment determines that there is a satisfied triggering condition in at least one triggering condition, the user equipment may initiate a communication process associated with the target triggering condition through the candidate cell resource associated with the target triggering condition in the satisfied triggering condition, thereby satisfying the service requirements of different businesses of the user equipment, maximizing the utilization ratio of network resources and improving the effectiveness of communication.

Optionally, in an embodiment of the present disclosure, each of the at least one triggering condition includes one or more of:

a data packet transmission delay is greater than or equal to a first preset threshold;

a packet loss rate of data packet is greater than or equal to a second preset threshold;

a data transmission rate is greater than or equal to a third preset threshold;

an integrity protection check failure;

a radio link failure;

a radio resource control (RRC) reconfiguration failure;

a handover failure; and a secondary cell group (SCG) access failure.

Optionally, in an embodiment of the present disclosure, the acquiring module 11 is further configured to:

receive an RRC reconfiguration message from a source node, where the RRC reconfiguration message includes the at least one candidate cell resource configuration.

Optionally, in an embodiment of the present disclosure, the at least one triggering condition is agreed by an agreement; or the RRC reconfiguration message further includes the at least one triggering condition.

Optionally, in an embodiment of the present disclosure, the communication process associated with the target triggering condition includes one of:

a handover process;

an RRC reestablishment process;
an SN Addition process;
an SN Modification process;
an SN Release process; and
an SN Change process.

Optionally, in an embodiment of the present disclosure, in a case that the user equipment is applied in a dual connectivity scenario, the source node is a source master node or a source secondary node, where the acquiring module 11 is further configured to:

receive the RRC reconfiguration message from the source master node or the source secondary node.

Optionally, in an embodiment of the present disclosure, there exist a plurality of satisfied triggering conditions, before the candidate cell resource configuration associated with the target triggering condition in the satisfied triggering condition is determined as the target cell resource configuration, the determining module 12 is further configured to:

select randomly one triggering condition from the satisfied triggering conditions as the target triggering condition; or select the target triggering condition from the satisfied triggering conditions according to preset triggering condition priorities.

The user equipment in the embodiment of the present disclosure may refer to the flow of the method shown in FIG. 1 corresponding to the embodiment of the present disclosure, and each unit/module in the user equipment and the above-mentioned other operations and/or functions are used to implement the method shown in FIG. 1 respectively. For the sake of brevity, the corresponding process in the method shown will not be repeated here.

Figure 9:
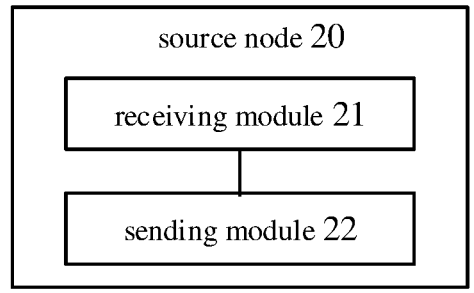
FIG. 9 is a schematic structural diagram of a source node in an embodiment of the present disclosure.

FIG. 9 is a schematic structural diagram of a source node in an embodiment of the present disclosure. As shown in FIG. 9, the source node 20 includes:

a receiving module 21, configured to receive at least one candidate cell resource configuration sent by a target node, where the at least one candidate cell resource configuration is configured by the target node based on at least one triggering condition, the at least one candidate cell resource configuration is configured to, in a case that a user equipment determines that the at least one triggering condition has a satisfied triggering condition, enable the user equipment to determine a candidate cell resource configuration associated with a target triggering condition in the satisfied triggering condition as a target cell resource configuration and initiate, based on the target cell resource configuration, a communication process associated with the target triggering condition; and a sending module 22, configured to send an RRC reconfiguration message to a user equipment, where the RRC reconfiguration message includes the at least one candidate cell resource configuration.

According to the wireless communication method in the embodiment of the present disclosure, after receiving at least one candidate cell resource configuration sent by the target node, the source node transmits the at least one candidate cell resource configuration to the user equipment. At least one candidate cell resource configuration is configured by the target node based on at least one triggering condition, thereby providing a solution for determining the cell resource configuration acquired in advance by the user equipment. In addition, when the user equipment determines that there is a satisfied triggering condition in the at least one triggering condition, the user equipment determines the candidate cell resource configuration associated with the target triggering condition in the satisfied triggering condition as the target cell resource configuration, and initiates the communication process associated with the target triggering condition based on the target cell resource configuration, thereby satisfying the service requirements of different businesses of the user equipment, maximizing the utilization ratio of network resources and improving the effectiveness of communication.

Optionally, in an embodiment of the present disclosure, the RRC reconfiguration message further includes at least one handover triggering condition.

Optionally, in an embodiment of the present disclosure, each of the at least one triggering condition includes one or more of:

a data packet transmission delay is greater than or equal to a first preset threshold;

a packet loss rate of data packet is greater than or equal to a second preset threshold;

a data transmission rate is greater than or equal to a third preset threshold;

an integrity protection check failure;

a radio link failure;

a radio resource control (RRC) reconfiguration failure;

a handover failure; and a secondary cell group (SCG) access failure.

Optionally, in an embodiment of the present disclosure, the at least one triggering condition is determined by the source node, before the candidate cell resource configuration sent by the target node is received by the receiving module 21, the sending module 22 is further configured to:

send the at least one triggering condition to the target node.

Optionally, in an embodiment of the present disclosure, the triggering condition is agreed by the source node and the target node, before the at least one candidate cell resource configuration sent by the target node is received by the receiving module 21, the receiving module 21 is further configured to:

receive candidate triggering conditions sent by the target node;

determine the at least one triggering condition from the candidate triggering conditions;

where the sending module 22 is further configured to send the at least one triggering condition to the target node.

Optionally, in an embodiment of the present disclosure, the at least one triggering condition is determined by the target node, and the receiving module 21 is further configured to:

receive the at least one triggering condition sent by the target node.

Optionally, in an embodiment of the present disclosure, the at least one triggering condition is determined by the target node from candidate triggering conditions, before the at least one triggering condition sent by the target node is received by the receiving module 21, the sending module 22 is further configured to:

send the candidate triggering conditions to the target node.

Optionally, in an embodiment of the present disclosure, the at least one triggering condition is determined by an agreement.

Optionally, in an embodiment of the present disclosure, in a case that the method is applied in a dual connectivity scenario, the source node is a source master node or a source secondary node, and the target node is a target secondary node.

The source node in the embodiment of the present disclosure may refer to the flow of the method shown in FIG.

2 corresponding to the embodiment of the present disclosure, and each unit/module in the source node and the other operations and/or functions described above are used to implement the method shown in FIG. 2 respectively. For the sake of brevity, details thereof will not be repeated here.

Figure 10:
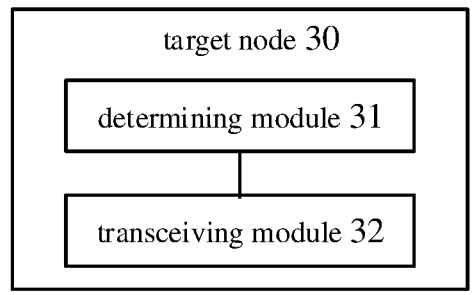
FIG. 10 is a schematic structural diagram of a target node in an embodiment of the present disclosure.

FIG. 10 is a schematic structural diagram of a target node in an embodiment of the present disclosure. As shown in FIG. 10, the target node 30 includes:

a determining module 31, configured to configure at least one candidate cell resource configuration based on at least one triggering condition, where the at least one candidate cell resource configuration is configured to, in a case that a user equipment determines that the at least one triggering condition has a satisfied triggering condition, enable the user equipment to determine a candidate cell resource configuration associated with a target triggering condition in the satisfied triggering condition as a target cell resource configuration and initiate, based on the target cell resource configuration, a communication process associated with the target triggering condition; and a transceiving module 32, configured to send the at least one candidate cell resource configuration to a source node, where the source node is configured to forward the at least one candidate cell resource configuration to the user equipment.

According to the wireless communication method in the embodiment of the present disclosure, the target node configures at least one candidate cell resource configuration based on at least one triggering condition, thereby providing a solution for determining the cell resource configuration acquired in advance by the user equipment. In addition, the target node sends at least one candidate cell resource configuration to the source node, to enable the source node forwards the at least one candidate cell resource configuration to the user equipment, so that when the user equipment determines that there is a satisfied triggering condition in the at least one triggering condition, the user equipment determines the candidate cell resource configuration associated with the target triggering condition in the satisfied triggering condition as the target cell resource configuration, and initiates the communication process associated with the target triggering condition based on the target cell resource configuration, thereby satisfying the service requirements of different businesses of the user equipment, maximizing the utilization ratio of network resources and improving the effectiveness of communication.

Optionally, in an embodiment of the present disclosure, each of the at least one triggering condition includes one or more of:

a data packet transmission delay is greater than or equal to a first preset threshold:

a packet loss rate of data packet is greater than or equal to a second preset threshold:

a data transmission rate is greater than or equal to a third preset threshold;

an integrity protection check failure;

a radio link failure;

a radio resource control (RRC) reconfiguration failure;

a handover failure; and a secondary cell group (SCG) access failure.

39. The target node according to claim 38, where the at least one triggering condition is determined by the source node, before the at least one candidate cell resource configuration is configured by the determining module based on the at least one triggering condition, the transceiving module is further configured to:

receive the at least one triggering condition sent by the source node.

Optionally, in an embodiment of the present disclosure, the triggering condition is agreed by the source node and the target node, and the triggering condition is determined by the source node from candidate triggering conditions, before the at least one candidate cell resource configuration is configured by the determining module 31 based on the at least one triggering condition, the transceiving module 32 is further configured to:

send the candidate triggering conditions to the source node; and receive the at least one triggering condition sent by the source node.

Optionally, in an embodiment of the present disclosure, the at least one triggering condition is determined by the target node, and the transceiving module 32 is further configured to:

send the at least one triggering condition to the source node.

Optionally, in an embodiment of the present disclosure, the at least one triggering condition is determined by the target node from candidate triggering conditions, before the at least one candidate cell resource configuration is configured by the determining module 31 based on the at least one triggering condition, the transceiving module 32 is further configured to:

receive candidate triggering conditions sent by the source node; and determine the at least one triggering condition from the candidate triggering conditions.

Optionally, in an embodiment of the present disclosure, the at least one triggering condition is determined by an agreement.

Optionally, in an embodiment of the present disclosure, in a case that the method is applied in a dual connectivity scenario, the source node is a source master node or a source secondary node, and the target node is a target secondary node.

The target node according to the embodiment of the present disclosure can refer to the flow of the method shown in FIG. 5 corresponding to the embodiment of the present disclosure, and each unit/module in the target node and the other operations and/or functions described above are used to implement the method shown in FIG. 6 respectively. For the sake of brevity, details thereof will not be repeated here.

Figure 11:
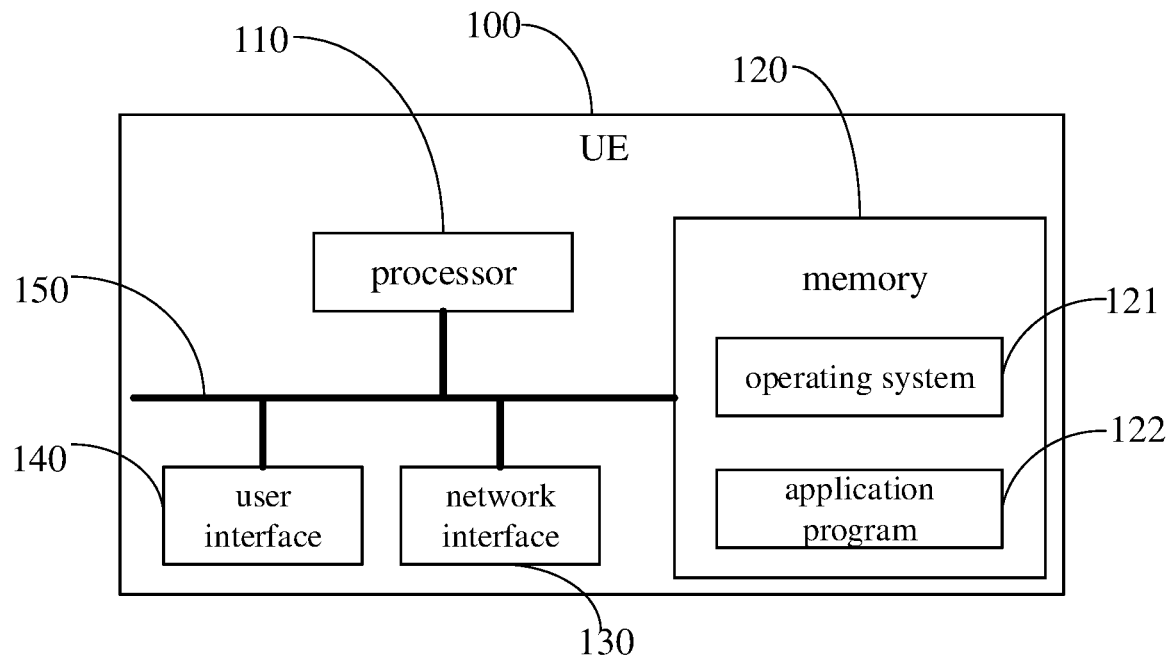
FIG. 11 is a schematic structural diagram of a user equipment in another embodiment of the present disclosure.

FIG. 11 is a schematic structural diagram of a user equipment in another embodiment of the present disclosure. As shown in FIG. 11, the user equipment 100 includes: at least one processor 110, a memory 120, at least one network interface 130, and a user interface 140. The various components in the user equipment 100 are coupled together through the bus system 150. It can be understood that the bus system 150 is used to implement connection and communication between these components. In addition to the data bus, the bus system 150 also includes a power bus, a control bus, and a status signal bus. However, for clear description, various buses are marked as the bus system 150 in FIG. 11.

The user interface 140 may include a display, a keyboard, or a pointing device (for example, a mouse, a trackball (trackball), a touch panel or a touch screen, etc.).

It can be understood that the memory 120 in the embodiment of the present disclosure may be a volatile memory or a non-volatile memory, or may include both volatile and non- volatile memory. The non-volatile memory may be a read-only memory (ROM), a programmable read-only memory (PROM), an erasable programmable read-only memory (EPROM), and Erase programmable read-only memory (EEPROM) or flash memory. The volatile memory may be random access memory (RAM), which is used as an external cache. By way of exemplary but not restrictive description, many forms of RAM are available, such as static random access memory (SRAM), dynamic random access memory (DRAM), synchronous dynamic random access memory (SDRAM), Double Data Rate Synchronous Dynamic Random Access Memory (DDRSDRAM), Enhanced Synchronous Dynamic Random Access Memory (ESDRAM), Synchronous Link Dynamic Random Access Memory (SLDRAM) and Direct Rambus RAM (DRRAM). The memory 120 of the system and method described in the embodiments of the present disclosure is intended to include, but is not limited to, these and any other suitable types of memory.

In some embodiments of the present disclosure, the memory 120 stores the following elements, executable modules or data structures, or a subset thereof, or an extended set thereof: the operating system 121 and the application 122.

The operating system 121 includes various system programs, such as a framework layer, a core library layer, a driver layer, etc., for implementing various basic services and processing hardware-based tasks. The application program 122 includes various application programs, such as a media player (Media Player), a browser (Browser), etc., for implementing various application services. A program for implementing the method of the embodiments of the present disclosure may be included in the application program 122.

In the embodiment of the present disclosure, the user equipment 100 further includes: a computer program stored in the memory 120 and executable on the processor 110, and when the computer program is executed by the processor 110, each process of the method described in FIG. 1 is implemented, And can achieve the same technical effect, in order to avoid repetition, details thereof will not repeated here.

The methods disclosed in the foregoing embodiments of the present disclosure may be applied in the processor 110 or implemented by the processor 110. The processor 110 may be an integrated circuit chip with signal processing capabilities. In the implementation process, the steps of the foregoing method may be completed by an integrated logic circuit of hardware in the processor 110 or instructions in the form of software. The aforementioned processor 110 may be a general-purpose processor, a digital signal processor (DSP), an application specific integrated circuit (ASIC), a ready-made programmable gate array (FPGA), or other Programmable logic devices, discrete gate or transistor logic devices, discrete hardware components. The methods, steps, and logical block diagrams disclosed in the embodiments of the present disclosure can be implemented or executed. The general-purpose processor may be a microprocessor or the processor may also be any conventional processor or the like. The steps of the method disclosed in the embodiments of the present disclosure may be directly embodied as being executed and completed by a hardware decoding processor, or executed by a combination of hardware and software modules in the decoding processor. The software module may be located in a computer-readable storage medium that is mature in the field, such as random access memory, flash memory, read-only memory, programmable read-only memory, or electrically erasable programmable memory, registers. The computer-readable storage medium is located in the memory 120, and the processor 110 reads information in the memory 120, and completes the steps of the foregoing method in combination with its hardware. Specifically, the computer-readable storage medium stores a computer program, and when the computer program is executed by the processor 110, each step of the method embodiment shown in FIG. 1 is implemented.

It can be understood that the embodiments described in the embodiments of the present disclosure may be implemented by hardware, software, firmware, middleware, microcode, or a combination thereof. For hardware implementation, the processing unit can be implemented in one or more application specific integrated circuits (ASICs), digital signal processors (DSP), digital signal processing devices (DSPD), programmable Logic Device (PLD), Field-Programmable Gate Array (FPGA), general-purpose processors, controllers, microcontrollers, microprocessors, and others for performing the functions described in this disclosure Electronic unit or its combination.

For software implementation, the technology described in the embodiments of the present disclosure can be implemented by modules (for example, procedures, functions, etc.) that perform the functions described in the embodiments of the present disclosure. The software codes may be stored in the memory and executed by the processor. The memory may be implemented in the processor or external to the processor.

Figure 12:
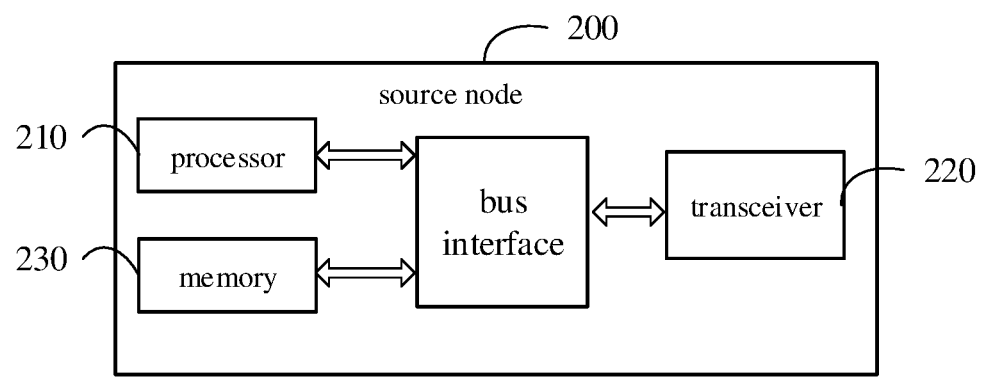
FIG. 12 is a schematic structural diagram of a source node in another embodiment of the present disclosure.

FIG. 12 is a schematic structural diagram of a source node in another embodiment of the present disclosure. As shown in FIG. 12, the source node 200 includes a processor 210, a transceiver 220, a memory 230, and a bus interface.

In the embodiment of the present disclosure, the source node 200 further includes: a computer program stored in the memory 230 and executable by the processor 210, and the processor 210 executes the computer program to perform the steps in the method shown in FIG. 2 hereinabove, and can achieve the same technical effect. In order to avoid repetition, details thereof will not be repeated here.

In FIG. 12, the bus architecture may include any number of interconnected buses and bridges. Specifically, one or more processors represented by the processor 210 and various circuits of the memory represented by the memory 230 are linked together. The bus architecture can also link various other circuits such as peripheral devices, voltage regulators, power management circuits, etc., which are all known in the art, and therefore, no further descriptions are provided herein. The bus interface provides the interface. The transceiver 220 may be a plurality of elements, that is, including a transmitter and a receiver, and provide a unit for communicating with various other devices on the transmission medium.

Figure 13:
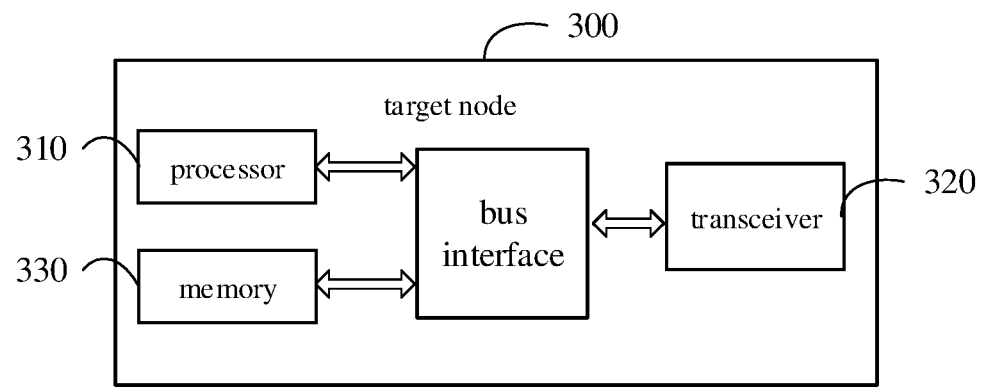
FIG. 13 is a schematic structural diagram of a target node in another embodiment of the present disclosure.

The processor 210 is responsible for managing the bus architecture and general processing, and the memory 230 may store data used by the processor 210 when performing operations, FIG. 13 is a schematic structural diagram of a target node in another embodiment of the present disclosure. As shown in FIG. 13, the target node 300 includes a processor 310, a transceiver 320, a memory 330, and a bus interface.

In the embodiment of the present disclosure, the target node 300 further includes: a computer program stored in the memory 330 and executable by the processor 310, and the processor 310 executes the computer program to perform the steps in the method shown in FIG. 6 hereinabove, and can achieve the same technical effect. In order to avoid repetition, details thereof will not be repeated here.

In FIG. 13, the bus architecture may include any number of interconnected buses and bridges. Specifically, one or more processors represented by the processor 310 and various circuits of the memory represented by the memory 330 are linked together. The bus architecture may also link various other circuits such as peripheral devices, voltage regulators, power management circuits, etc., which are all known in the art, and therefore, no further descriptions are provided herein. The bus interface provides the interface. The transceiver 320 may be a plurality of elements, that is, including a transmitter and a receiver, and provide a unit for communicating with various other devices on the transmission medium.

The processor 310 is responsible for managing the bus architecture and general processing, and the memory 330 may store data used by the processor 310 when performing operations. The embodiments of the present disclosure also provide a computer-readable storage medium on which a computer program is stored. When the computer program is executed by a processor, each process of the foregoing method embodiment is implemented, and the same technical effect can be achieved. To avoid repetition, details thereof are repeated here. The computer-readable storage medium, such as read-only memory (ROM), random access memory (RAM), magnetic disk or optical disk, etc.

It should be noted that in this article, the terms "including", "includes" or any other variants thereof are intended to cover non-exclusive inclusion, so that a process, method, article or device including a series of elements not only includes those elements, it also includes other elements not explicitly listed, or elements inherent to the process, method, article, or device. If there are no more restrictions, the element defined by the sentence "including a . . ." does not exclude the existence of other identical elements in the process, method, article or device that includes the element.

Through the description of the above embodiments, those skilled in the art may clearly understand that the method of the above embodiments may be implemented by means of software plus the necessary general hardware platform. Of course, it can also be implemented by hardware, but in many cases the former is better. Based on this understanding, the technical solution of the present disclosure essentially or the part that contributes to the prior art can be embodied in the form of a software product, and the computer software product is stored in a storage medium (such as ROM/RAM, magnetic disk, optical disc) includes several instructions to make a terminal (which can be a mobile phone, a computer, a server, an air conditioner, or a network device, etc.) execute the methods described in the various embodiments of the present disclosure.

The embodiments of the present disclosure are described above with reference to the drawings, but the present disclosure is not limited to the above embodiments. The above specific embodiments are only illustrative and not restrictive. Those of ordinary skill in the art may make many forms without departing from the purpose of the present disclosure and the scope of the claims, all of which fall within the scope of the present disclosure.

What is claimed is:

1. A wireless communication method, applied to a user equipment, comprising:
acquiring at least one candidate cell resource configuration, wherein the at least one candidate cell resource configuration is configured by a target node based on at least one triggering condition;
in a case that the at least one triggering condition has a satisfied triggering condition, determining a candidate cell resource configuration associated with a target triggering condition in the satisfied triggering condition as a target cell resource configuration; and
initiating a communication process associated with the target triggering condition, based on the target cell resource configuration;
wherein the at least one triggering condition corresponds to service requirements, and the at least one triggering condition comprises one or more of:
a data packet transmission delay is greater than or equal to a first preset threshold;
a packet loss rate of data packet is greater than or equal to a second preset threshold;
a data transmission rate is greater than or equal to a third preset threshold; or
a secondary cell group (SCG) access failure;
wherein the communication process associated with the target triggering condition comprises one of:
in a case that the data transmission rate is greater than or equal to the third preset threshold, initiating a secondary node (SN) Addition process for the target node;
in a case that the data packet transmission delay is greater than or equal to the first preset threshold, initiating an SN Modification process for a source node; or
in a case of a secondary cell group (SCG) access failure, initiating an SN Change process for the target node;
wherein there exist a plurality of satisfied triggering conditions, prior to the determining the candidate cell resource configuration associated with the target triggering condition in the satisfied triggering condition as the target cell resource configuration, the method further comprises:
selecting the target triggering condition from the satisfied triggering conditions according to preset triggering condition priorities.

2. The wireless communication method according to claim 1, wherein the acquiring the at least one candidate cell resource configuration comprises:
receiving a radio resource control (RRC) reconfiguration message from the source node, wherein the RRC reconfiguration message comprises the at least one candidate cell resource configuration.

3. The wireless communication method according to claim 2, wherein the at least one triggering condition is agreed by an agreement; or the RRC reconfiguration message further comprises the at least one triggering condition.

4. The wireless communication method according to claim 2, wherein the communication process associated with the target triggering condition further comprises a handover process.

5. The wireless communication method according to claim 2, wherein in a case that the method is applied in a dual connectivity scenario, the source node is a source master node or a source secondary node, wherein the receiving the RRC reconfiguration message from the source node comprises:
receiving the RRC reconfiguration message from the source master node or the source secondary node.

6. A user equipment, comprising: a memory, a processor and a computer program stored in the memory and executable on the processor, wherein the processor executes the computer program to perform the wireless communication method according to claim 1.

7. A wireless communication method, applied to a source node, comprising:
receiving at least one candidate cell resource configuration sent by a target node, wherein the at least one candidate cell resource configuration is configured by the target node based on at least one triggering condition, the at least one candidate cell resource configuration is configured to, in a case that a user equipment determines that the at least one triggering condition has a satisfied triggering condition, enable the user equipment to determine a candidate cell resource configuration associated with a target triggering condition in the satisfied triggering condition as a target cell resource configuration and initiate, based on the target cell resource configuration, a communication process associated with the target triggering condition; and sending a radio resource control (RRC) reconfiguration message to a user equipment, wherein the RRC reconfiguration message comprises the at least one candidate cell resource configuration;

wherein the at least one triggering condition corresponds to service requirements, and the at least one triggering condition comprises one or more of:

a data packet transmission delay is greater than or equal to a first preset threshold;

a packet loss rate of data packet is greater than or equal to a second preset threshold;

a data transmission rate is greater than or equal to a third preset threshold; or a secondary cell group (SCG) access failure;

wherein the communication process associated with the target triggering condition comprises one of:

in a case that the data transmission rate is greater than or equal to the third preset threshold, initiating a secondary node (SN) Addition process for the target node;

in a case that the data packet transmission delay is greater than or equal to the first preset threshold, initiating an SN Modification process for a source node; or in a case of a secondary cell group (SCG) access failure, initiating an SN Change process for the target node;

wherein the at least one triggering condition is agreed by an agreement, and the method further comprises:

sending a handover request sent to the target node, wherein the handover request contains 1 bit to indicate that the handover request is a condition-based handover request.

8. The wireless communication method according to claim 7, wherein the at least one triggering condition is agreed by an agreement, or the RRC reconfiguration message further comprises the at least one triggering condition.

9. The wireless communication method according to claim 8, wherein the at least one triggering condition is determined by the source node, prior to the receiving the candidate cell resource configuration sent by the target node, the method further comprises: sending the at least one triggering condition to the target node;

or, the triggering condition is agreed by the source node and the target node, prior to the receiving the at least one candidate cell resource configuration sent by the target node, the method further comprises:

receiving candidate triggering conditions sent by the target node;

determining the at least one triggering condition from the candidate triggering conditions; and sending the at least one triggering condition to the target node;

or, the at least one triggering condition is determined by the target node, and the method further comprises: receiving the at least one triggering condition sent by the target node.

10. The wireless communication method according to claim 9, wherein the at least one triggering condition is determined by the target node from candidate triggering conditions, prior to the receiving the at least one triggering condition sent by the target node, the method further comprises: sending the candidate triggering conditions to the target node.

11. The wireless communication method according to claim 7, wherein in a case that the method is applied in a dual connectivity scenario, the source node is a source master node or a source secondary node, and the target node is a target secondary node.

12. A source node, comprising: a memory, a processor and a computer program stored in the memory and executable on the processor, wherein the processor executes the computer program to perform the wireless communication method according to claim 7.

13. A wireless communication method, applied to a target node, comprising:

configuring at least one candidate cell resource configuration based on at least one triggering condition, wherein the at least one candidate cell resource configuration is configured to, in a case that a user equipment determines that the at least one triggering condition has a satisfied triggering condition, enable the user equipment to determine a candidate cell resource configuration associated with a target triggering condition in the satisfied triggering condition as a target cell resource configuration and initiate, based on the target cell resource configuration, a communication process associated with the target triggering condition; and sending the at least one candidate cell resource configuration to a source node, wherein the source node is configured to forward the at least one candidate cell resource configuration to the user equipment;

wherein the at least one triggering condition corresponds to service requirements, and the at least one triggering condition comprises one or more of:

a data packet transmission delay is greater than or equal to a first preset threshold;

a packet loss rate of data packet is greater than or equal to a second preset threshold;

a data transmission rate is greater than or equal to a third preset threshold; or a secondary cell group (SCG) access failure;

wherein the communication process associated with the target triggering condition comprises one of:

in a case that the data transmission rate is greater than or equal to the third preset threshold, initiating a secondary node (SN) Addition process for the target node;

in a case that the data packet transmission delay is greater than or equal to the first preset threshold, initiating an SN Modification process for the source node; or in a case of a secondary cell group (SCG) access failure, initiating an SN Change process for the target node;

wherein the at least one triggering condition is agreed by an agreement, and the method further comprises:

sending a handover request sent to the target node, wherein the handover request contains 1 bit to indicate that the handover request is a condition-based handover request.

14. The wireless communication method according to claim 13, wherein the at least one triggering condition is determined by the source node, prior to the configuring the at least one candidate cell resource configuration based on the at least one triggering condition, the method further comprises:

receiving the at least one triggering condition sent by the source node;

or, the triggering condition is agreed by the source node and the target node, and the triggering condition is determined by the source node from candidate triggering conditions, prior to the configuring the at least one candidate cell resource configuration based on the at least one triggering condition, the method further comprises:

sending the candidate triggering conditions to the source node; and receiving the at least one triggering condition sent by the source node;

or, the at least one triggering condition is determined by the target node, and the method further comprises:

sending the at least one triggering condition to the source node;

or, the at least one triggering condition is determined by an agreement.

15. The wireless communication method according to claim 14, wherein the at least one triggering condition is determined by the target node from candidate triggering conditions, prior to the configuring the at least one candidate cell resource configuration based on the at least one triggering condition, the method further comprises:

receiving candidate triggering conditions sent by the source node; and determining the at least one triggering condition from the candidate triggering conditions.

16. The wireless communication method according to claim 13, wherein in a case that the method is applied in a dual connectivity scenario, the source node is a source master node or a source secondary node, and the target node is a target secondary node.

17. A target node, comprising: a memory, a processor and a computer program stored in the memory and executable on the processor, wherein the processor executes the computer program to perform the wireless communication method according to claim 13.

* * * * *